US012485862B2

(12) United States Patent
Nakabayashi et al.

(10) Patent No.: US 12,485,862 B2
(45) Date of Patent: Dec. 2, 2025

(54) AUTOMATED BRAKING CONTROL DEVICE AND AUTOMATED BRAKING PROCESSING PROGRAM

(71) Applicants: AISIN CORPORATION, Kariya (JP); HONDA MOTOR CO., LTD., Tokyo (JP)

(72) Inventors: Atsushi Nakabayashi, Kariya (JP); Tatsuya Watanabe, Tokyo (JP); Kohei Toshima, Tokyo (JP)

(73) Assignees: AISIN CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 18/565,300

(22) PCT Filed: Jun. 27, 2022

(86) PCT No.: PCT/JP2022/025466
§ 371 (c)(1),
(2) Date: Nov. 29, 2023

(87) PCT Pub. No.: WO2023/276919
PCT Pub. Date: Jan. 5, 2023

(65) Prior Publication Data
US 2024/0359672 A1  Oct. 31, 2024

(30) Foreign Application Priority Data
Jun. 30, 2021  (JP) ................... 2021-108508

(51) Int. Cl.
*B60T 7/22*  (2006.01)
*B60T 8/171*  (2006.01)
(Continued)

(52) U.S. Cl.
CPC .................. *B60T 8/58* (2013.01); *B60T 7/22* (2013.01); *B60T 8/171* (2013.01);
(Continued)

(58) Field of Classification Search
CPC .......... B60T 8/58; B60T 7/22; B60T 8/17558; B60T 2201/022; B60T 2201/024;
(Continued)

(56) References Cited

U.S. PATENT DOCUMENTS 11,562,635 B2*  1/2023  Imaizumi ................ G01S 15/87
2011/0115615 A1*  5/2011  Luo ........................... B60R 1/30
348/148
(Continued)

FOREIGN PATENT DOCUMENTS

JP  2013100064 A  5/2013
JP  2014-076696 A  5/2014
(Continued)

OTHER PUBLICATIONS

International Search Report (PCT/ISA/210) with translation and Written Opinion mailed on Sep. 6, 2022, by the Japanese Patent Office as the International Searching Authority for International Application No. PCT/JP2022/025466. (11 pages).

*Primary Examiner* — Phutthiwat Wongwian
*Assistant Examiner* — Brian R Kirby
(74) *Attorney, Agent, or Firm* — BUCHANAN INGERSOLL & ROONEY PC

(57) ABSTRACT

An automated braking control device includes: an acquisition unit to acquire traveling direction information representing a traveling direction of a vehicle, speed information related to the vehicle, and position information of an object based on a detection wave transmitted and received for detecting the object in the traveling direction; an area determination unit to determine an automated braking
(Continued)

execution area on the basis of the traveling direction information and the speed information, the automated braking execution area being set in at least one of an inner area and an outer area with respect to a vehicle width line, the vehicle width line extending in the traveling direction in accordance with a vehicle width of the vehicle; and an automated braking processing unit to, when the object is detected, determine whether to execute automated braking on the basis of the position information with respect to the automated braking execution area.

12 Claims, 6 Drawing Sheets

(51) Int. Cl.
  *B60T 8/1755* (2006.01)
  *B60T 8/58* (2006.01)
  *B60W 30/085* (2012.01)
  *B60W 30/095* (2012.01)
  *B60W 60/00* (2020.01)
(52) U.S. Cl.
  CPC ....... *B60T 8/17558* (2013.01); *B60W 30/085* (2013.01); *B60W 30/095* (2013.01); *B60W 30/0956* (2013.01); *B60W 60/0011* (2020.02); *B60T 2201/022* (2013.01); *B60T 2201/024* (2013.01); *B60T 2210/32* (2013.01); *B60T 2250/04* (2013.01)
(58) Field of Classification Search
  CPC ..... B60T 7/12; B60W 30/085; B60W 30/095; B60W 30/0956; B60W 60/0011; B60W 30/09

USPC .......................................................... 701/41
  See application file for complete search history.

(56) References Cited

U.S. PATENT DOCUMENTS

| | | | |
|---|---|---|---|
| 2015/0032288 A1* | 1/2015 | Huth | G08G 1/16 701/1 |
| 2015/0232073 A1* | 8/2015 | Fujishiro | B60W 30/09 701/70 |
| 2016/0063861 A1* | 3/2016 | Lee | G08G 1/14 340/932.2 |
| 2016/0125738 A1* | 5/2016 | Rosen | G08G 1/166 701/70 |
| 2017/0074661 A1* | 3/2017 | Zhang | G01C 21/20 |
| 2017/0277184 A1* | 9/2017 | Fujimura | B60W 10/20 |
| 2018/0114442 A1* | 4/2018 | Minemura | B60R 21/013 |
| 2018/0215378 A1* | 8/2018 | Edo Ros | B60W 50/14 |
| 2019/0050650 A1* | 2/2019 | Takaki | G06T 7/60 |
| 2019/0061750 A1* | 2/2019 | Tamura | B60W 30/0956 |
| 2019/0291731 A1* | 9/2019 | Takaki | B60R 21/00 |
| 2021/0024059 A1* | 1/2021 | Miyamoto | B60W 30/095 |
| 2021/0404553 A1* | 12/2021 | Endo | E01C 19/26 |
| 2023/0101872 A1* | 3/2023 | Kwon | B60W 30/095 701/26 |

FOREIGN PATENT DOCUMENTS

| | | | |
|---|---|---|---|
| JP | 2016164031 A | | 9/2016 |
| JP | 2017171273 A | | 9/2017 |
| JP | 2020117068 A | * | 8/2020 |

* cited by examiner

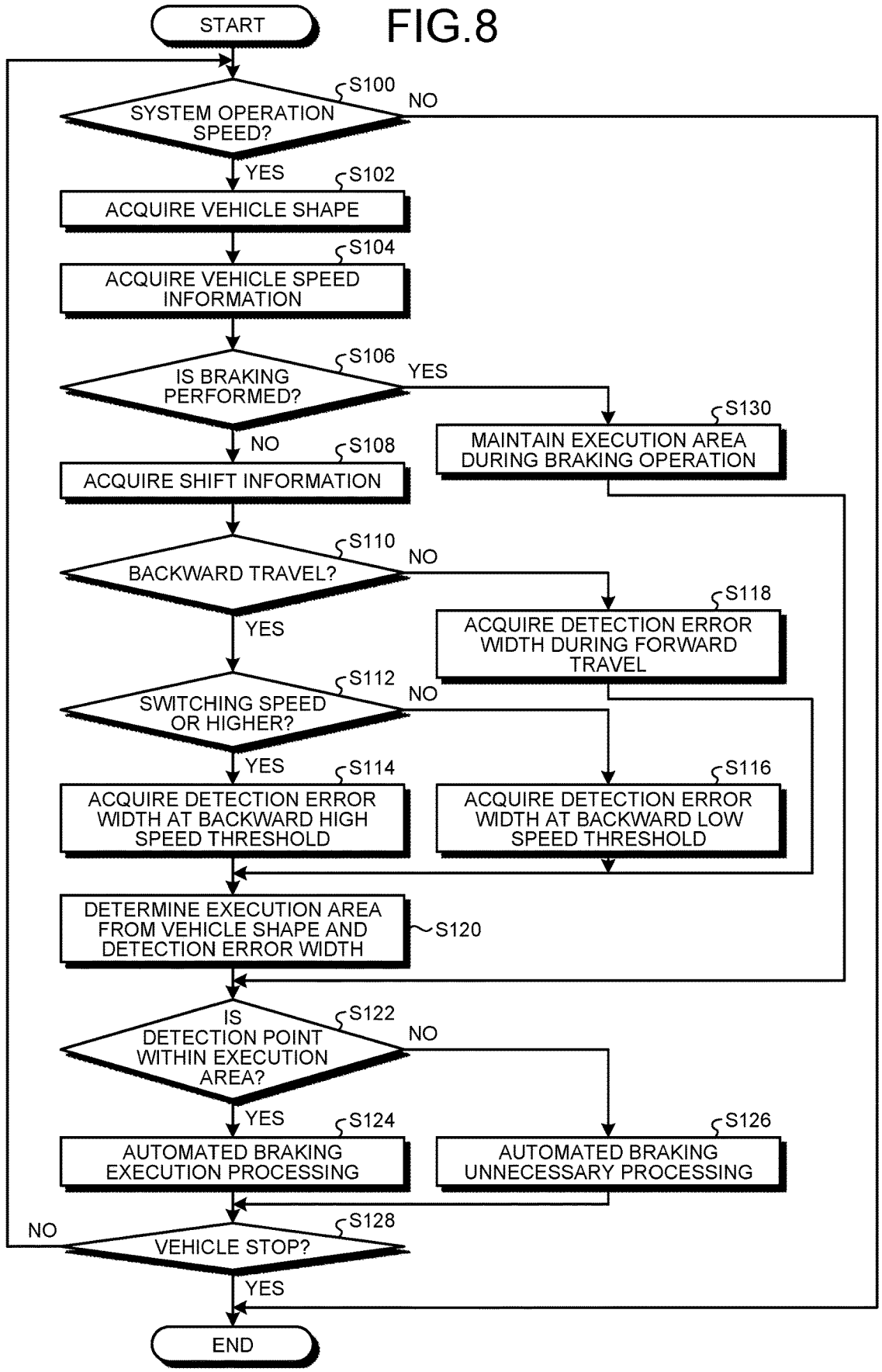

AUTOMATED BRAKING CONTROL DEVICE AND AUTOMATED BRAKING PROCESSING PROGRAM

TECHNICAL FIELD

The disclosure here relates to an automated braking control device and an automated braking processing program.

BACKGROUND ART

Conventionally, there has been a proposed system that detects an obstacle (object) in a traveling direction of a vehicle by using a camera, a radar, or the like, and automatically executes an emergency braking operation or a contact avoidance operation when the detected obstacle exists within an operation range which is determined to be in a course of the vehicle (host vehicle).

CITATION LIST

Patent Literature

Patent Literature 1: JP 2013-100064 A
Patent Literature 2: JP 2016-164031 A

SUMMARY

Problem to be Solved

However, depending on a travel scene of a vehicle and a position of an obstacle (object) with respect to the host vehicle, the emergency braking or the contact avoidance operation may be excessively executed, and a travel desired by a driver may be hindered.

Therefore, one of aims of embodiment is to provide an automated braking control device and an automated braking processing program capable of executing more appropriate automated braking control in accordance with a traveling state of the vehicle, a state of an object, etc.

Means for Solving Problem

An automated braking control device according to an embodiment includes, for example: an acquisition unit configured to acquire traveling direction information representing a traveling direction of a vehicle, speed information related to the vehicle, and position information of an object based on a detection wave transmitted and received for detecting the object in the traveling direction: an area determination unit configured to determine an automated braking execution area on the basis of the traveling direction information and the speed information, the automated braking execution area being set in at least one of an inner area and an outer area with respect to a vehicle width line, the vehicle width line extending in the traveling direction in accordance with a vehicle width of the vehicle; and an automated braking processing unit configured to, when the object is detected, determine whether to execute automated braking on the basis of the position information with respect to the automated braking execution area. With this configuration, for example, more appropriate automated braking control can be executed in accordance with the traveling state of the vehicle, the state of the object, etc.

In the automated braking control device according to the embodiment, the area determination unit is configured to: set, in an inner area inside the vehicle width line, an automated braking execution area boundary line being a boundary of the automated braking execution area in response to determining that the traveling direction information represents forward travel of the vehicle and the speed information represents a first speed or lower; set the automated braking execution area boundary line to include at least an outer area outside the vehicle width line in response to determining that the traveling direction information represents backward travel of the vehicle and the speed information represents lower than a second speed: and set the automated braking execution area boundary line in the outer area outside the vehicle width line in response to determining that the traveling direction information represents backward travel of the vehicle and the speed information represents the second speed or higher. With this configuration, for example, more appropriate automated braking control can be executed when the vehicle travels forward and when the vehicle travels backward.

In the automated braking control device according to the embodiment, the automated braking execution area has an area range being set on the basis of variation in detection positions obtained when triangulation using two of sensors is performed, the sensors being provided at each of a front end and a rear end of the vehicle to transmit and receive the detection wave. With this configuration, for example, the detection accuracy of the object can be improved, and more appropriate automated braking control according to the traveling state of the vehicle, the state of the object, etc. can be executed.

In the automated braking control device according to the embodiment, the area determination unit is configured to determine the automated braking execution area by the speed information obtained when the object is detected, and maintain the determined automated braking execution area until the vehicle stops. With this configuration, for example, since a control determination state at the time of starting the automated braking is maintained even when the vehicle speed decreases by the automated braking control, it is possible to suppress a change in the braking state due to the change in the automated braking execution area during the control.

In the automated braking control device according to the embodiment, the automated braking execution area is set such that an outer area of the vehicle width line in a case where the vehicle travels backward is wider than in a case where the vehicle travels forward. With this configuration, for example, during backward travel in which it is more difficult to check the surrounding situation than during forward travel, it is possible to implement braking control in consideration of the safety side.

An automated braking processing program according to an embodiment causes a computer to execute: an acquisition step of acquiring traveling direction information representing a traveling direction of a vehicle, speed information related to the vehicle, and position information of an object based on a detection wave transmitted and received for detecting the object in the traveling direction: an area determination step of determining an automated braking execution area on the basis of the traveling direction information and the speed information, the automated braking execution area being set in at least one of an inner area and an outer area with respect to a vehicle width line, the vehicle width line extending in the traveling direction in accordance with a vehicle width of the vehicle: and an automated braking processing unit step of, when the object is detected, determining whether to execute automated braking on the basis of the position information with respect to the automated braking execution area. With this configuration, for example, more appropriate automated braking control can be executed in accordance with the traveling state of the vehicle, the state of the object, etc.

BRIEF DESCRIPTION OF DRAWINGS

FIG. 1 is an exemplary perspective view schematically illustrating a state where part of a vehicle interior of a vehicle equipped with an automated braking control device according to an embodiment is seen through;

FIG. 8 is an exemplary flowchart illustrating a flow of automated braking control processing by the automated braking control device (automated braking control unit) according to the embodiment.

DESCRIPTION OF EMBODIMENTS

Hereinafter, exemplary embodiments are disclosed. The configurations of the embodiments described below, and actions, results, and effects brought by the configurations are examples. The disclosure here can be implemented by a configuration other than the configuration disclosed in the following embodiment, and at least one of various effects of the basic configuration and derivative effects can be obtained.

Figure 1:
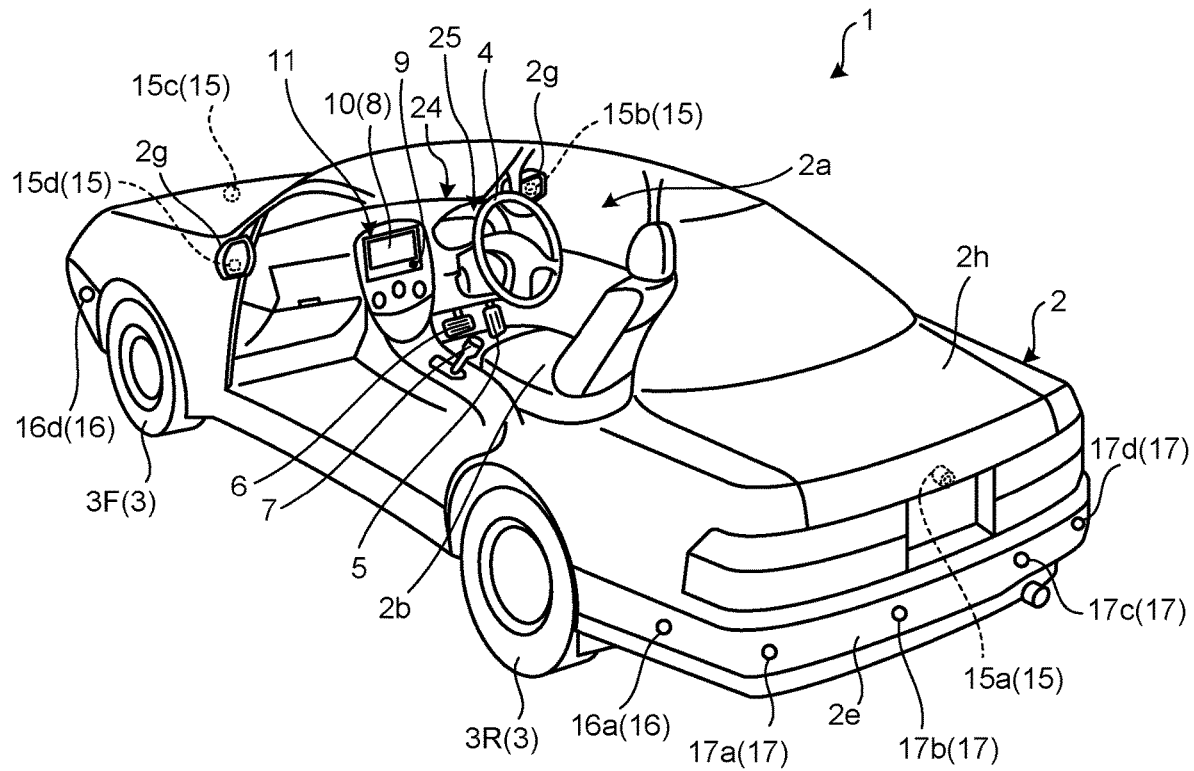

FIG. 1 is an exemplary perspective view schematically illustrating a state where part of a vehicle interior 2a of a vehicle 1 equipped with an automated braking control device according to an embodiment is seen through. The vehicle equipped with the automated braking control device according to the present embodiment may be an automobile using an internal combustion engine (engine) as a driving source (internal combustion engine automobile), an automobile using an electric motor (motor) as a driving source (such as electric vehicle or fuel cell vehicle) or may be an automobile using both the engine and the motor as driving sources (hybrid automobile). In addition, the vehicle can be equipped with various transmission devices and various devices (such as systems and components) necessary for driving the internal combustion engine and the electric motor. In addition, the type, number, layout, etc. of the device related to the driving of wheels in the vehicle can be variously set.

As illustrated in FIG. 1, a vehicle body 2 of the vehicle 1 configures the vehicle interior 2a in which an occupant (not illustrated) rides. In the vehicle interior 2a, a steering unit 4, an acceleration operation unit 5, a braking operation unit 6, and a shift operation unit 7 are provided in a state of facing a seat 2b of a driver as an occupant. The steering unit 4 is, for example, a steering wheel protruding from a dashboard 24. The acceleration operation unit 5 is, for example, an accelerator pedal positioned at the feet of the driver. The braking operation unit 6 is, for example, a brake pedal positioned at the feet of the driver. The shift operation unit 7 is, for example, a shift lever protruding from a center console.

In the vehicle interior 2a, a display device 8 (display unit) and a voice output device 9 as a voice output unit are provided. The display device 8 is, for example, a liquid-crystal display (LCD) or an organic electroluminescent display (OELD). The voice output device 9 is, for example, a speaker. In addition, the display device 8 is covered with a transparent operation input unit 10 such as a touch panel. The occupant (user) can visually recognize the image displayed on a display screen of the display device 8 via the operation input unit 10. In addition, the occupant can execute an operation input by an operation of touching, pushing, or moving the operation input unit 10 with a finger or the like at a position corresponding to the image displayed on the display screen of the display device 8. The display device 8, the voice output device 9, the operation input unit 10, and so forth are provided in, for example, a monitor device 11 positioned at the center of the dashboard 24 in a vehicle width direction, that is, a left-right direction. The monitor device 11 can include an operation input unit (not illustrated) such as a switch, a dial, a joystick, and a push button. In addition, a voice output device (not illustrated) can be provided at another position in the vehicle interior 2a different from the monitor device 11, and voice can be output from the voice output device 9 of the monitor device 11 and another voice output device. Note that the monitor device 11 can also be used, for example, as a navigation system or an audio system.

Figure 2:
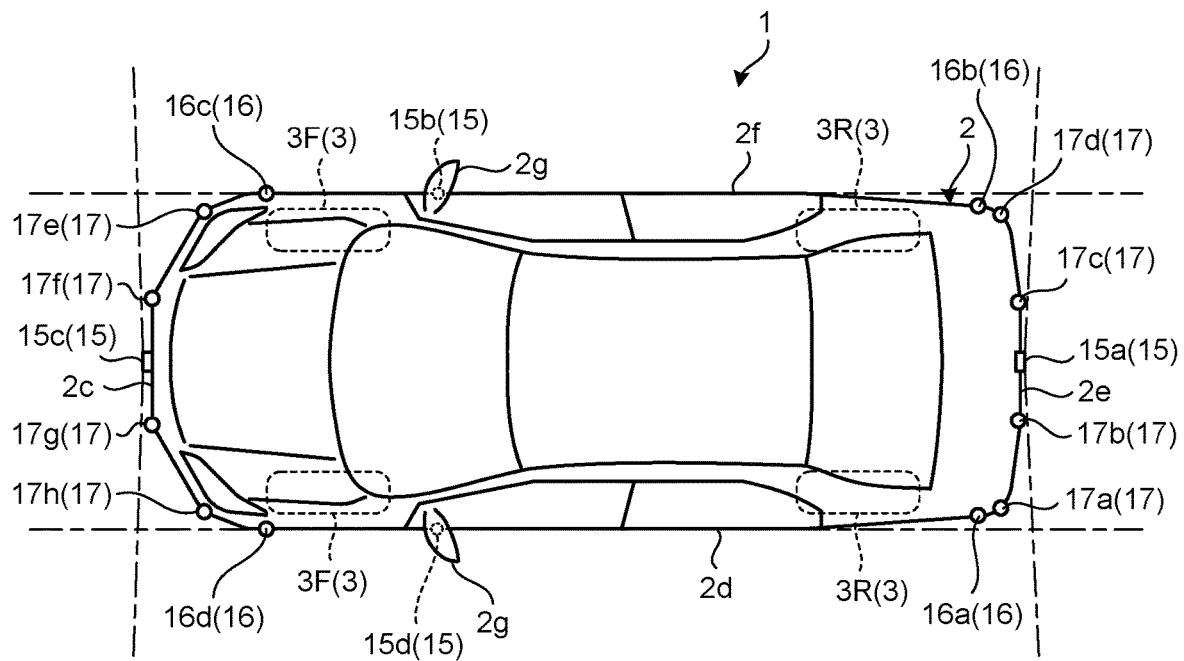
FIG. 2 is an exemplary plan view schematically illustrating the vehicle equipped with the automated braking control device according to the embodiment.

FIG. 2 is an exemplary plan view schematically illustrating the vehicle 1 equipped with the automated braking control device according to the present embodiment. As illustrated in FIGS. 1 and 2, the vehicle 1 is a four-wheeled automobile or the like and includes two left and right front wheels 3F and two left and right rear wheels 3R. All or some of the wheels 3 of four steering unit can be steered.

The vehicle body 2 is provided with, for example, four image capturing units 15a to 15d as the image capturing units 15. The image capturing unit 15 is, for example, a digital camera incorporating an image capturing element such as a charge coupled device (CCD) or a CMOS image sensor (CIS). The image capturing unit 15 can output moving image data at a predetermined frame rate. Each image capturing unit 15 includes a wide-angle lens or a fisheye lens, and is capable of capturing an image in a range of, for example, 140° to 220° in a horizontal direction. The optical axis of the image capturing unit 15 is set obliquely downward. Therefore, the image capturing unit 15 sequentially captures images of an external environment around the vehicle body 2 including a road surface on which the vehicle 1 can move and an area where the vehicle 1 can be parked and outputs the images as captured image data.

The image capturing unit 15a is positioned, for example, at a rear end 2e of the vehicle body 2, is provided on a wall part below a door 2h of the trunk, and captures an image of the situation of a rear area of the vehicle 1. For example, the image capturing unit 15b is positioned at a right end 2f of the vehicle body 2, is provided on a right door mirror 2g, and captures an image of a situation of an area including the right front, right side, and right rear of the vehicle 1. The image capturing unit 15c is positioned, for example, at the front side of the vehicle body 2, namely, at an end 2c on the front side in the vehicle front-rear direction, and is provided on a front bumper or the like to capture an image of the situation of the front area of the vehicle 1. The image capturing unit 15d is positioned, for example, on the left side of the vehicle body 2, that is, on a left end 2d in the vehicle width direction and is provided on a left door mirror 2g as a protruding part, thereby capturing an image of a situation of an area including the left front, the left side, and the left rear of the vehicle 1. An ECU 14 (see FIG. 3) functioning as one of the control units that monitor the surroundings of the vehicle 1 can execute arithmetic processing and image processing on the basis of the captured image data obtained by the image capturing units 15 to generate an image with a wider viewing angle or generate a virtual overhead image when the vehicle 1 is viewed from above (directly above or obliquely above).

In addition, the vehicle 1 includes radars 16 as a distance measurement unit capable of measuring a distance to an object present outside the vehicle 1. The radar 16 is, for example, a millimeter wave radar or the like, and can measure a distance to an object present in a traveling direction of the vehicle 1 (a direction in which the vehicle 1 directs). In the present embodiment, the vehicle 1 includes radars 16a to 16d. The radar 16a is provided at, for example, the left end of the rear bumper of the vehicle 1, and can measure a distance to an object present on the left rear of the vehicle 1. The radar 16b is provided at the right end of the rear bumper of the vehicle 1, and can measure a distance to an object present on the right rear of the vehicle 1. The radar 16c is provided at the right end of the front bumper of the vehicle 1, and can measure a distance to an object present on the right front of the vehicle 1. The radar 16d is provided at the left end of the front bumper of the vehicle 1, and can measure a distance to an object present on the left front of the vehicle 1.

In addition, the vehicle 1 includes sonar 17 that can measure a distance to an external object present at a relatively short distance from the vehicle 1 by using an ultrasonic wave. In the present embodiment, an object (obstacle) for determining whether there is an operation of automated braking (emergency braking) is detected by using a detection result of the sonar 17. The vehicle 1 includes sonars 17a to 17h. The sonars 17a to 17d are provided in the rear bumper (rear end) of the vehicle 1, and are able to measure whether there is an object present behind the vehicle and a distance to the object. The sonars 17e to 17h are provided in the front bumper (front end) of the vehicle 1, and are able to measure whether there is an object present in front of the vehicle 1 and a distance to the object. As the sonar 17, a well-known sonar can be used.

Figure 3:
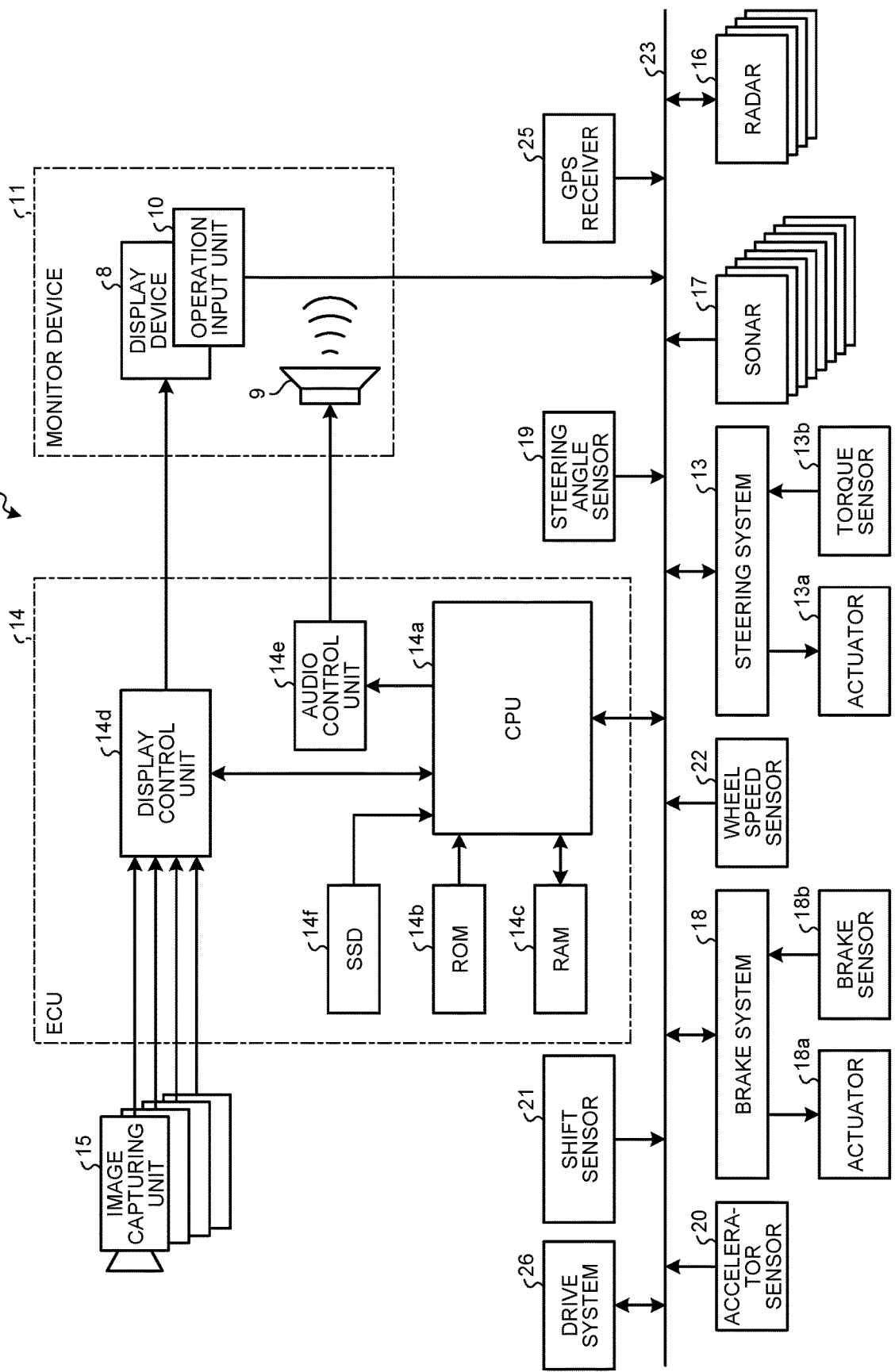
FIG. 3 is an exemplary block diagram schematically illustrating a functional configuration of a control system of the vehicle including the automated braking control device according to the present embodiment.

FIG. 3 is an exemplary block diagram schematically illustrating a functional configuration of a control system 100 of the vehicle 1 including the automated braking control device according to the present embodiment. As illustrated in FIG. 3, in addition to the ECU 14, the monitor device 11, a steering system 13, the radar 16, and the sonar 17, a brake system 18, a steering angle sensor 19, an accelerator sensor 20, a shift sensor 21, a wheel speed sensor 22, a global positioning system (GPS) receiver 25, a drive system 26, and so forth are electrically connected in the control system 100 via an in-vehicle network 23 as an electric communication line. The in-vehicle network 23 is configured as, for example, a controller area network (CAN). The ECU 14 can control the steering system 13, the brake system 18, the drive system 26, and so forth by sending a control signal through the in-vehicle network 23. Moreover, the ECU 14 can receive, over the in-vehicle network 23, detection results of a torque sensor 13b, a brake sensor 18b, the steering angle sensor 19, the radar 16, the sonar 17, the accelerator sensor 20, the shift sensor 21, the wheel speed sensor 22, and the GPS receiver 25, and operation signals of switches such as the operation input unit 10.

The steering system 13 is an electric power steering system, a steer by wire (SBW) system, or the like. The steering system 13 includes an actuator 13a and the torque sensor 13b. The steering system 13 is electrically controlled by the ECU 14 or the like and operates the actuator 13a to add torque to the steering unit 4 and supplement steering force, thereby steering the wheels 3. The torque sensor 13b detects the torque applied to the steering unit 4 by the driver and transmits the detection result to the ECU 14.

The brake system 18 includes an anti-lock brake system (ABS) that controls the brake lock of the vehicle 1, an electronic stability control (ESC) that suppresses the sideslip of the vehicle 1 during cornering, an electric brake system that reinforces the braking force to assist the brake, and a brake by wire (BBW). The brake system 18 includes an actuator 18a and the brake sensor 18b. The brake system 18 is electrically controlled by the ECU 14 or the like and applies braking power to the wheel 3 via the actuator 18a. The brake system 18 detects a brake lock, idling of the wheel 3, a sign of sideslip, etc. from a rotation difference of the left and right wheels 3 and the like, and executes control to suppress the brake lock, the idling of the wheel 3, and the sideslip. The brake sensor 18b is a displacement sensor that detects a position of the brake pedal as a movable part of the braking operation unit 6 and transmits a detection result of the position of the brake pedal to the ECU 14.

When an object (obstacle) is detected from an automated braking execution area that is set in a traveling direction of the vehicle 1 on the basis of a traveling state of the vehicle 1 (for example, a traveling direction or a vehicle speed), the vehicle 1 with the automated braking control device of the present embodiment executes braking control for avoiding contact with the object (obstacle) by controlling the brake system 18 to automatically generate braking power regardless of a driver's intention to brake. Details of the braking control using the automated braking execution area will be described later.

The steering angle sensor 19 is a sensor that detects a steering amount (steering angle) of the steering unit 4 such as a steering wheel. The steering angle sensor 19 is configured with a Hall element or the like. The steering angle sensor 19 detects the rotation angle of the rotating part of the steering unit 4 as a steering amount, and transmits the detection result to the ECU 14. The ECU 14 (CPU 14a) may calculate a tire angle on the basis of the acquired steering angle. In this case, for example, the calculation may be executed by using a conversion map of the steering angle and the tire angle prepared in advance for each vehicle type or may be executed on the basis of a predetermined arithmetic expression. In another embodiment, a tire angle sensor may be provided in a steering mechanism to directly acquire the tire angle. When an automated braking execution area is set or an object (obstacle) exists as one of the traveling direction information of the vehicle 1, the steering angle and the tire angle can be used to determine whether the object is included in the automated braking execution area.

The accelerator sensor 20 is a displacement sensor that detects the position of the accelerator pedal as a movable part of the acceleration operation unit 5 and transmits the detection result to the ECU 14.

The shift sensor 21 is a sensor that detects positions of movable parts (such as bars, arms, and buttons) of the shift operation unit 7 and transmits the detection results to the ECU 14. The detection result of the shift sensor 21 can be used as one of traveling direction information representing whether the vehicle 1 can travel forward or backward.

The wheel speed sensor 22 is a sensor that includes a Hall element or the like and detects the rotation amount of the wheel 3 and a rotation number of the wheel 3 per unit time and transmits the detection result to the ECU 14. The vehicle speed, the movement amount, and so forth of the vehicle 1 can be calculated on the basis of the detection result of the wheel speed sensor 22. In a case where the vehicle speed of the vehicle 1 is calculated on the basis of the detection value of the wheel speed sensor 22 of each wheel 3, the vehicle speed of the vehicle 1 can be determined on the basis of the speed of the wheel 3 having the smallest detection value among the four wheels.

The GPS receiver 25 acquires the current position of the vehicle 1 on the basis of the radio wave received from the artificial satellite.

The drive system 26 is an internal combustion engine (engine) system or a motor system as a driving source. The drive system 26 controls a fuel injection amount and an intake air quantity of the engine and an output value of the motor in accordance with a requested operation amount (for example, a depressed amount of the accelerator pedal) of the driver (user) detected by the accelerator sensor 20. In addition, the output values of the engine and the motor can be controlled in cooperation with the control of the steering system 13 and the brake system 18 in accordance with the traveling state of the vehicle 1 regardless of the operation of the user. For example, travel assistance such as normal travel assistance or parking assistance can be executed. When the automated braking control (emergency braking) is executed by the brake system 18, the drive system 26 executes the output suppression control regardless of the operation of the driver.

Note that the configurations, arrangements, electrical connection forms, etc. of the various sensors and actuators described above are merely examples and can be variously set (changed).

The ECU 14 is configured with a computer and configured to execute overall control of the vehicle 1 by hardware and software in cooperation. Specifically, the ECU 14 includes the central processing unit (CPU) 14a, a read only memory (ROM) 14b, a random access memory (RAM) 14c, a display control unit 14d, an audio control unit 14e, and a solid state drive (SSD) 14f. The CPU 14a, the ROM 14b, and the RAM 14c may be provided in the same circuit board.

The CPU 14a can read a program installed and stored in a nonvolatile storage device such as the ROM 14b and execute arithmetic processing in accordance with the program. In addition, the CPU 14a determines the automated braking execution area on the basis of, for example, a traveling state (traveling direction information representing forward or backward movement) obtained from the shift sensor 21 of the vehicle 1, speed information based on a detection result of the wheel speed sensor 22, position information of an object obtained by the sonar 17, etc. In addition, the CPU 14a can execute calculation and control of the automated control processing in order to control the brake system 18 on the basis of the position information of the object with respect to the determined automated braking execution area. Note that the CPU 14a is also capable of executing calculation and control of image processing related to an image displayed on the display device 8. For example, the CPU 14a can execute a display for notifying the driver or the like that the automated braking control is being executed. In addition, the CPU 14a can execute distortion correction processing of correcting distortion by executing arithmetic processing or image processing to the captured image data (data of a curved image) of the wide-angle image obtained by the image capturing unit 15 or can generate an overhead image (surrounding image) displaying a vehicle image (host vehicle icon) indicating the vehicle 1, for example, at a center position on the basis of the captured image data captured by the image capturing unit 15 and display the overhead image on the display device 8. In addition, when generating the overhead image, the CPU 14a can change the position of the virtual viewpoint and generate an overhead image that faces the vehicle image from directly above or an overhead image that faces the vehicle image from an oblique direction.

Note that, when executing travel assistance such as parking assistance, the CPU 14a may execute display that allows the driver to easily recognize the situation of parking assistance and the surrounding situation of the vehicle 1 at the time of parking assistance. In this case, the display device 8 may implement image display (for example, back monitor display) that easily increase the sense of security of the driver at the time of the travel assistance and easily allows to feel burden alleviation at the time of driving.

The ROM 14b stores various programs, parameters necessary for executing the programs, and so forth. The RAM 14c temporarily stores various data used in the calculation in the CPU 14a. As the arithmetic processing by the ECU 14, the display control unit 14d mainly executes image processing on image data acquired from the image capturing unit 15 and output to the CPU 14a, conversion of the image data acquired from the CPU 14a into image data for display to be displayed on the display device 8, etc. As the arithmetic processing in the ECU 14, the audio control unit 14e mainly executes processing of a voice acquired from the CPU 14a and output to the voice output device 9. The SSD 14f is a rewritable nonvolatile storage unit and continues to store data acquired from the CPU 14a even when the power supply of the ECU 14 is turned off. Note that the CPU 14a, the ROM 14b, and the RAM 14c can be integrated in the same package. Moreover, the ECU 14 may have a configuration in which another logical operation processor such as a digital signal processor (DSP), a logic circuit, or the like is used instead of the CPU 14a. In addition, a hard disk drive (HDD) may be provided instead of the SSD 14f, and the SSD 14f and the HDD may be provided separately from the ECU 14.

Figure 4:
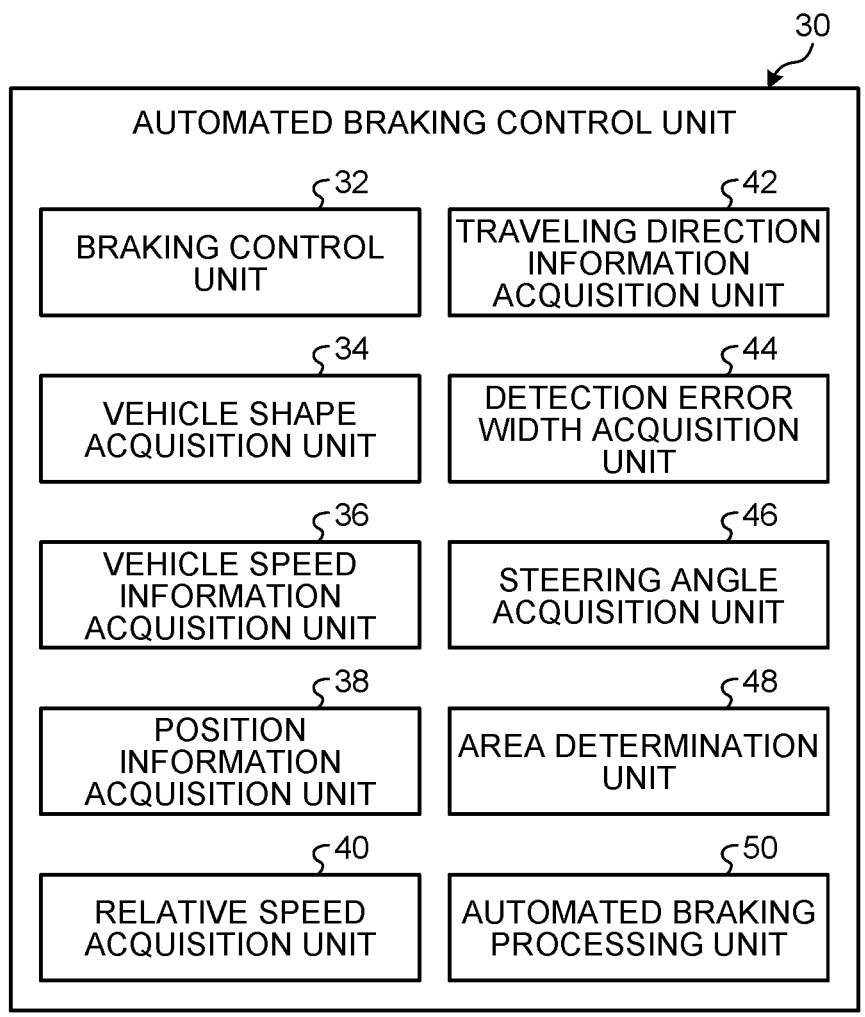
FIG. 4 is an exemplary block diagram schematically illustrating a configuration of an automated braking control device (automated braking control unit) according to the embodiment.

FIG. 4 is an exemplary block diagram schematically illustrating a configuration in a case where the automated braking control device (automated braking control unit 30) according to the embodiment is implemented by the CPU 14a. The CPU 14a executes the automated braking processing program read from the ROM 14b to implement the automated braking control unit 30 including modules such as a braking control unit 32, a vehicle shape acquisition unit 34, a vehicle speed acquisition unit 36, a position information acquisition unit 38, a relative speed acquisition unit 40, a traveling direction information acquisition unit 42, a detection error width acquisition unit 44, a steering angle acquisition unit 46, an area determination unit 48, and an automated braking processing unit 50 as illustrated in FIG. 4. Note that some of or all the automated braking control unit 30, the braking control unit 32, the vehicle shape acquisition unit 34, the vehicle speed acquisition unit 36, the position information acquisition unit 38, the relative speed acquisition unit 40, the traveling direction information acquisition unit 42, the detection error width acquisition unit 44, the steering angle acquisition unit 46, the area determination unit 48, and the automated braking processing unit 50 may be configured by hardware such as a circuit. Although not illustrated in FIG. 4, the CPU 14a can also implement various modules necessary for traveling of the vehicle 1.

In the present embodiment, the automated braking control unit 30 executes automated braking (emergency braking) to avoid contact with an object (obstacle) present on the course of the vehicle 1. In particular, the operation is executed in a case where the vehicle 1 travels at a low vehicle speed (first speed, for example, several tens of km/h or less) such as a parking scene or a scene where the vehicle 1 approaches or passes through a narrow space. However, as described above, there is a case where the driver feels annoyance when the automated braking is executed excessively. Moreover, for example, in a parking scene, in a case where it is necessary to park a vehicle to approach an adjacent vehicle, a fence, or the like with a narrow distance to an extent that no problem occurs, or in a case where it is desired to pass through a narrow space, if the braking control is automatically executed, it is likely to result in hindering driving desired by the driver. In this case, it is desirable to make the execution condition of the automated braking different between: a case where the vehicle 1 travels forward and it is relatively easy for the driver to visually confirm the object or determine the likeliness of contact, and the like, and a case where the vehicle 1 travels backward and it is difficult for the driver to visually confirm the object or determine the likeliness of contact, and the like, compared to the case of traveling forward. For example, during the forward travel, since the object recognizability by the driver is higher than that during the backward travel, the operation (driving) by the driver is prioritized, and the execution of the automated braking is controlled to be moderate. Meanwhile, during the backward travel, since the object recognizability by the driver is likely to be lower than that during the forward travel, the control (safety) by the system is prioritized, and the execution of the automated braking is controlled to be easier than that during the forward travel. Note that in the case of the backward travel, the driver tends to be more sensitive to the vehicle speed than in the case of the forward travel. Therefore, in the case of the backward travel, the execution condition of automated braking may be further changed with the vehicle speed. For example, when the backward speed is equal to or lower than the first speed (for example, several tens of km/h or less) at which the automated braking is executed and equal to or higher than the second speed (for example, several km/h or more), the required stop distance of the vehicle 1 becomes longer than that when the backward speed is lower than the second speed. Therefore, the execution range of the automated braking is widened. On the contrary, when the vehicle speed is less than the second speed, the required stop distance of the vehicle 1 becomes short, and thus the execution range of the automated braking is narrowed and brought close to the execution range during the forward travel. As a result, both reduction of fear of the driver and reduction of annoyance caused by excessive execution of automated braking can be achieved.

Hereinafter, the configuration of the automated braking control unit 30 is specifically described.

When the brake system 18 is not operated, that is, when the driver does not operate the braking operation unit 6, the braking control unit 32 can control the actuator 18a of the brake system 18 to generate the braking power regardless of the driver's intention. For example, when an object (obstacle) that is likely to come into contact with the host vehicle is detected in the traveling direction of the vehicle 1 by the radar 16, the sonar 17, the image capturing unit 15, and so forth, the braking control unit 32 operates the brake system 18 to stop or decelerate the vehicle 1 by automated braking.

The vehicle shape acquisition unit 34 acquires vehicle width information from specification information of the vehicle 1 stored in, for example, ROM 14b in order to acquire the vehicle width line which is one of the references when the automated braking execution area where the automated braking is executed is determined. In the present embodiment, the vehicle width line is a line that is set to be, for example, about 0.1 m outside the actual vehicle width of the vehicle 1 and is set to extend, for example, about 5 m in the traveling direction of the vehicle 1. In addition, the extending direction of the vehicle width line may vary with the traveling direction of the vehicle 1 in accordance with the steering angle acquired by the steering angle acquisition unit 46.

As described above, the vehicle speed acquisition unit 36 acquires the vehicle speed on the basis of the rotation amount of each wheel 3 acquired by the wheel speed sensor 22 and the rotation number of the wheel 3 per unit time. The automated braking control unit 30 determines whether the automated braking control can be executed in accordance with the acquired speed. When the vehicle speed is equal to or lower than the first speed (for example, several tens of km/h or less), the automated braking control unit 30 can execute the automated braking control.

Figure 5:
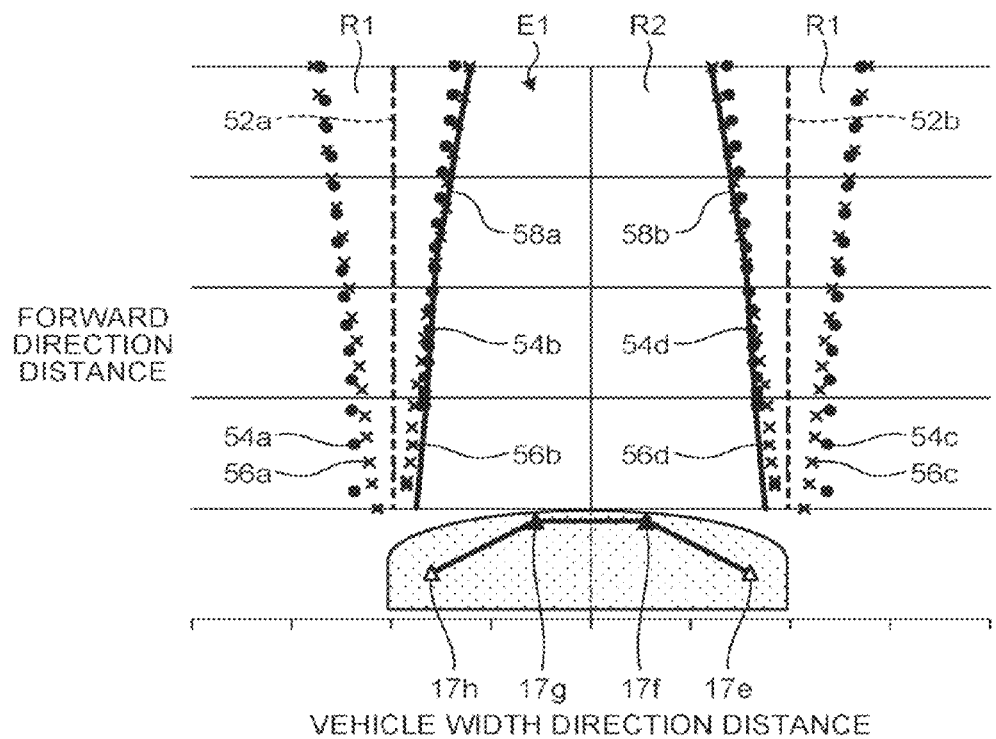
FIG. 5 is an exemplary explanatory diagram schematically illustrating a detection error width and an automated braking execution area used during the forward travel in the automated braking control device according to the embodiment.

The position information acquisition unit 38 calculates (acquires) a distance to the object on the basis of transmission waves transmitted by each sonar 17 in accordance with a known technique and reception waves (detection waves) that are the transmission waves reflected by the object (obstacle) and returned. The position information acquisition unit 38 of the present embodiment calculates (acquires) a distance to the object, for example, by using triangulation by a combination of two sonars 17. In the case of the present embodiment, for example, as illustrated in FIG. 5, the distance is measured by combining two of the four sonars 17 provided on a front bumper of the vehicle 1. For example, distance calculation (distance measurement) is performed in the left area with the front of the vehicle 1 as a boundary by performing triangulation with the sonar 17f and the sonar 17g and distance calculation (distance measurement) is performed in the same left area by performing triangulation with the sonar 17h and the sonar 17g, so that the position information acquisition unit 38 acquires position information including the presence or absence of an object (obstacle) that may exist in the left area in the traveling direction of the vehicle 1 and the distance to the object when the object exists. Similarly, distance calculation (distance measurement) is performed in the right area with the front of the vehicle 1 as a boundary by performing triangulation with the sonar 17f and the sonar 17g and distance calculation (distance measurement) is performed in the same right area by performing triangulation with the sonar 17e and the sonar 17f, so that the position information acquisition unit 38 acquires position information in the right area. Note that the position information using the sonar 17 generally includes a detection error. Therefore, in the present embodiment, control is executed in consideration of the detection error width acquired by the detection error width acquisition unit 44. The extension error width will be described later. Moreover, the method of detecting an object (measuring a distance) using the sonar 17 can be changed as appropriate, and for example, the position information may be acquired on the basis of the detection result of the individual sonar 17, or the position information may be acquired by using the detection results of three or more sonars 17.

Examples of a form in which the vehicle 1 and an object (obstacle) come into contact with each other include a case where the object is stationary and only the vehicle 1 is moving, a case where only the object is moving and the vehicle 1 is stopped, and a case where both the vehicle 1 and the object are moving. Therefore, the relative speed acquisition unit 40 acquires relative speed between the vehicle 1 and the object on the basis of the speed information (vehicle speed information) acquired by the vehicle speed acquisition unit 36 and the position information acquired by the position information acquisition unit 38 and reflects the relative speed on the braking start timing or the like of the automated braking control, thereby contributing to the improvement of the stop accuracy.

The traveling direction information acquisition unit 42 acquires traveling direction information representing whether the vehicle 1 can currently travel forward or backward on the basis of the detection result of the shift sensor 21.

The detection error width acquisition unit 44 acquires the detection error width generated when acquiring the position information of the object (obstacle) with the sonar 17 as described above, on the basis of the traveling direction information, the vehicle speed information, and so forth of the vehicle 1. The detection error width can be determined in advance by a test or the like, be stored in the ROM 14b, the SSD 14f, or the like, and be read.

For example, FIG. 5 is an exemplary explanatory diagram schematically illustrating a detection error width and an automated braking execution area used during the forward travel of the vehicle 1 in the automated braking control device (automated braking control unit 30). As described above, the distance calculation (distance measurement) is executed in the left area with the front of the vehicle 1 (the vehicle width direction distance of "0") as a boundary by executing triangulation with the sonars 17f and 17g and the sonars 17g and 17h provided on the front bumper of the vehicle 1. In the case of FIG. 5, an object detection error range by the sonar 17 when a dummy object (for example, a pole) is arranged on a left vehicle width line 52a extending in (toward) the front direction from a left end in the vehicle width direction of the vehicle 1 is indicated by marks 54a and 54b and marks 56a and 56b. The position of the dummy object on the left vehicle width line 52a can be set to a position corresponding to a stop distance when braking with predetermined braking power is executed for each vehicle speed at the start of braking of the vehicle 1. The stop distance is a known value determined by the vehicle speed and the performance (braking capability) of a braking device (brake system 18). That is, an area indicated by the point groups of the marks 54a and 54b and the marks 56a and 56b is an area where an object existing at a position where it can be considered that it is possible to stop without coming into contact with the vehicle 1 narrowly at any vehicle speed can be detected. In a case where the vehicle 1 travels forward, in response to determining that an object exists in the area indicated by the point groups of the marks 54a and 54b and the marks 56a and 56b and automated braking is executed, the automated braking is executed even though the likeliness of contact is actually low, and thus it is regarded as excessive control. Therefore, the detection error width acquisition unit 44 acquires an area surrounded by the point groups of the marks 54a and 54b and the marks 56a and 56b as the detection error width of the object during the forward travel in the left area. Note that the point group of the marks 54a (filled circle marks) and the point group of the marks 56a (× marks) indicate the point groups on the outermost edge side of the left area with reference to the front of the vehicle 1, as the detection result by the sonars 17f and 17g and the detection result by the sonars 17g and 17h, respectively. Also, the point group of the marks 54b (filled circle marks) and the point group of the marks 56b (× marks) indicate the point groups on the innermost edge side of the left area with reference to the front of the vehicle 1, as the detection result by the sonars 17f and 17g and the detection result by the sonars 17g and 17h, respectively.

Similarly, distance calculation (distance measurement) is executed in the right area with the front of the vehicle 1 (vehicle width direction distance of "0") as a boundary by executing triangulation with the sonars 17f and 17g and the sonars 17e to 17f. An area indicated by the point groups of marks 54c and 54d and marks 56c and 56d is an area where an object existing at a position where it can be considered that it is possible to stop without coming into contact with the vehicle 1 narrowly at any vehicle speed can be detected. In a case where the vehicle 1 travels forward, in response to determining that an object exists in the area indicated by the point groups of the marks 54c and 54d and the marks 56c and 56d and automated braking is executed, the automated braking is executed even though the likeliness of contact is actually low, and thus it is regarded as excessive control. Therefore, the detection error width acquisition unit 44 acquires an area surrounded by the point groups of the marks 54c and 54d and the marks 56c and 56d as the detection error width of the object during the forward travel in the right area. Note that the point group of the marks 54c (filled circle marks) and the point group of the marks 56c (× marks) indicate the point groups on the outermost edge side of the right area with reference to the front of the vehicle 1, as the detection result by the sonars 17f and 17g and the detection result by the sonars 17e and 17f, respectively. The point group of the marks 54d (filled circle marks) and the point group of the marks 56d (× marks) indicate the point groups on the innermost edge side of the right area with reference to the front of the vehicle 1, as the detection result by the sonars 17f and 17g and the detection result by the sonars 17e and 17g, respectively.

Figure 6:
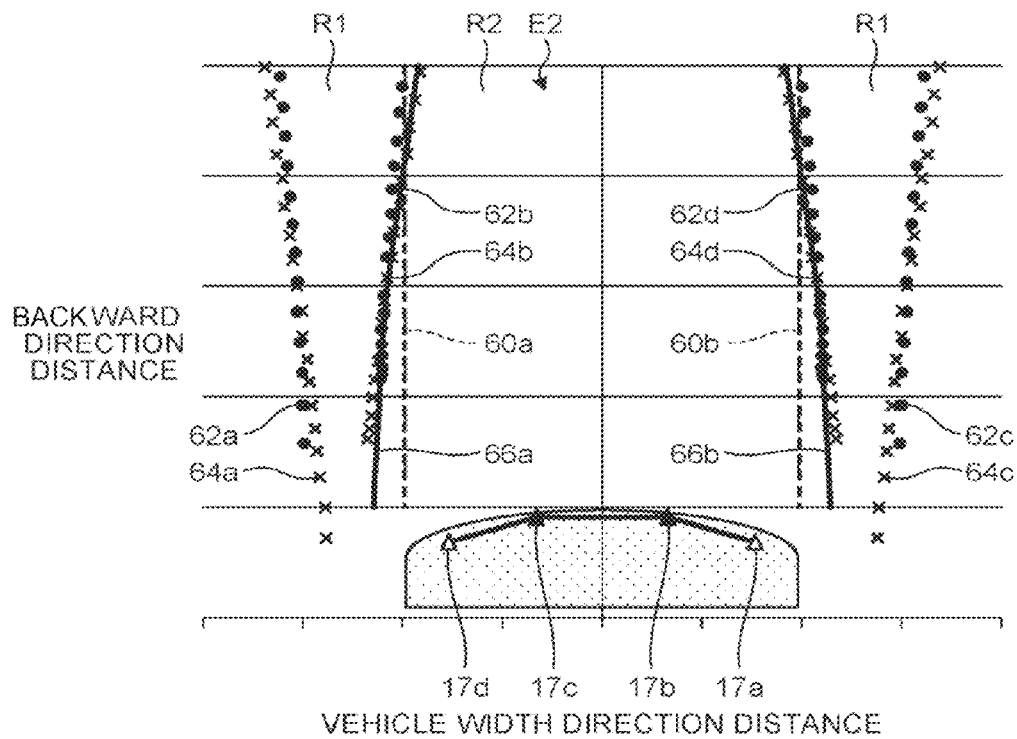
FIG. 6 is an exemplary explanatory diagram schematically illustrating a detection error width and an automated braking execution area used during the backward low speed travel in the automated braking control device according to the embodiment.
Figure 7:
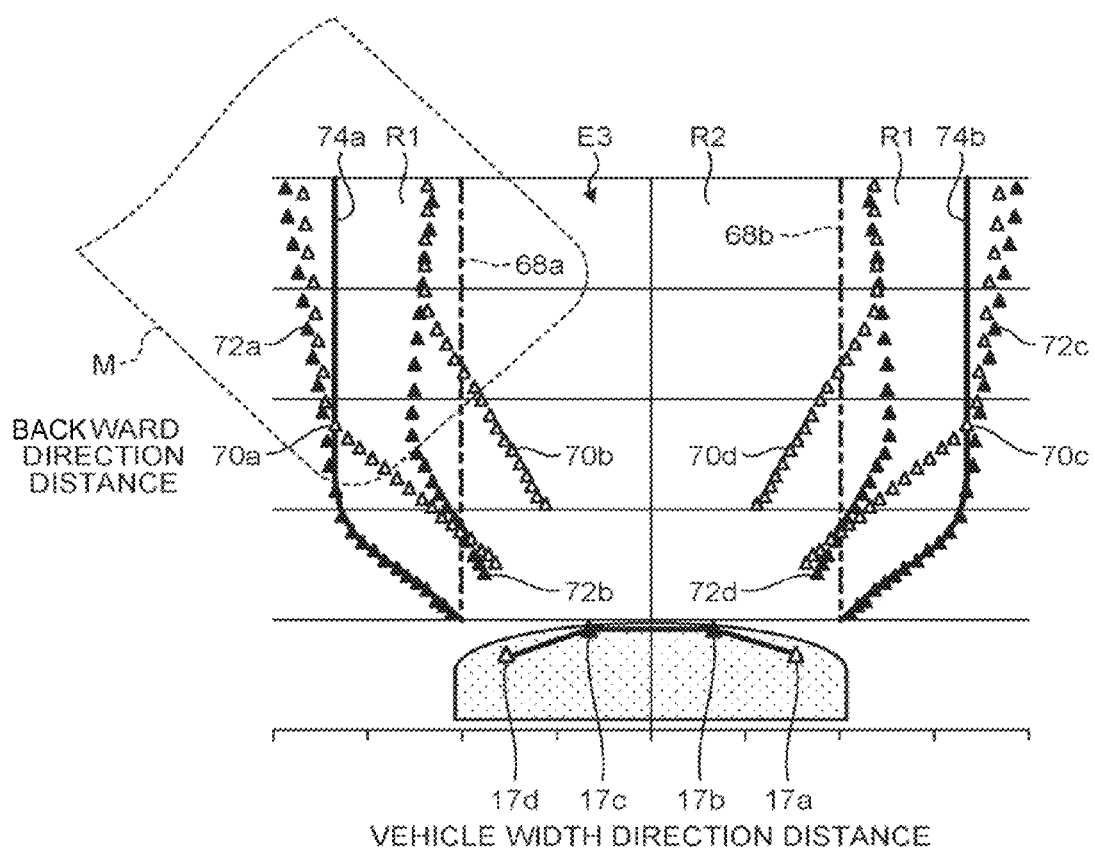
FIG. 7 is an exemplary explanatory diagram schematically illustrating a detection error width and an automated braking execution area used during the backward high speed travel in the automated braking control device according to the embodiment.

FIGS. 6 and 7 are exemplary explanatory diagrams schematically illustrating a detection error width and an automated braking execution area when the vehicle 1 travels backward. As described above, in the case of the backward travel, the visibility of the surroundings tends to be lower than that in the forward travel, so that the detection error width and the automated braking execution area are set separately for the case of backward low speed travel (second speed, for example, less than several km/h) and the case of the first speed (for example, several tens of km/h or less) at which the automated braking control can be executed at the second speed or higher.

FIG. 6 is an exemplary explanatory diagram schematically illustrating a detection error width and an automated braking execution area used during the backward low speed travel of the vehicle 1 (less than the second speed, for example, less than several km/h) in the automated braking control device (automated braking control unit 30). In this case, the distance calculation (distance measurement) is executed in the left area with the rear front of the vehicle 1 (the vehicle width direction distance of "0") as a boundary by executing triangulation with the sonars 17b and 17c and the sonars 17c and 17d provided on the rear bumper of the vehicle 1.

As described above, automated braking processing is executed when the speed is equal to or lower than the first speed (for example, several tens of km/h or less), but the visibility of the driver with respect to the surroundings may be reduced during the backward travel as compared with that during the forward travel. Therefore, when an object exists on the course of the vehicle 1, the recognition of the object may be delayed. Therefore, in order to execute the automated braking processing in a state where there is a margin in the distance to the object, in the case of the backward low speed travel illustrated in FIG. 6, the object detection error range by the sonar 17 in a case where a dummy object (for example, a pole) is arranged at a predetermined distance, for example, at a position 0.3 m away from the left vehicle width line 60a extending in (toward) a rear direction from the left end in the vehicle width direction of the vehicle 1 on the outer side in the vehicle width direction (the left side in the drawing) is indicated by marks 62a and 62b and the marks 64a and 64b. The position of the dummy object separated from a left vehicle width line 68a by a predetermined distance is a position obtained by adding a predetermined distance (for example, 0.3 m) to a stop distance in a case where braking with predetermined braking power is performed for each vehicle speed at the start of braking of the vehicle 1. The stop distance is a known value determined by the vehicle speed and the performance (braking capability) of the braking device. That is, an area indicated by the point groups of the marks 62a and 62b and the marks 64a and 64b is an area where an object existing at a position where it can be considered that it is possible to stop without coming into contact with the vehicle 1 with a margin of a predetermined distance (for example, 0.3 m) at any vehicle speed can be detected. In a case where the vehicle 1 travels backward at a low speed, in response to determining that an object exists in the area indicated by the point groups of the marks 62a and 62b and the marks 64a and 64b and automated braking is executed, the automated braking is executed even though the likeliness of contact is actually low, and thus it is regarded as excessive control. Therefore, the detection error width acquisition unit 44 acquires an area surrounded by the point groups of the marks 62a and 62b and the marks 64a and 64b as the detection error width of the object during the backward low speed travel in the left area. Note that the point group of the marks 62a (filled circle marks) and the point group of the marks 64a (× marks) indicate the point groups on the outermost edge side of the left area with reference to the rear front of the vehicle 1, as the detection result by the sonars 17b and 17c and the detection result by the sonars 17c and 17d, respectively. The point group of the marks 62b (filled circle marks) and the point group of the marks 64b (× marks) indicate the point groups on the innermost edge side of the left area with reference to the rear front of the vehicle 1, as the detection result by the sonars 17b and 17c and the detection result by the sonars 17c and 17d, respectively.

Similarly, distance calculation (distance measurement) is executed in the right area with the rear front of the vehicle 1 (vehicle width direction distance of "0") as a boundary by executing triangulation with the sonars 17b and 17c and the sonars 17a and 17b. An area indicated by the point groups of the marks 62c and 62d and the marks 64c and 64d is an area where an object existing at a position where it can be considered that it is possible to stop without coming into contact with the vehicle 1 with a margin of a predetermined distance (for example, 0.3 m) at any vehicle speed can be detected. In a case where the vehicle 1 travels backward at a low speed, when an object exists in the area indicated by the point groups of the marks 62c and 62d and the marks 64c and 64d and automated braking is executed, the automated braking is executed even though the likeliness of contact is actually low, and thus it is regarded as excessive control. Therefore, the detection error width acquisition unit 44 acquires an area surrounded by the point groups of the marks 62c and 62d and the marks 64c and 64d as the detection error width of the object during the backward low speed travel in the right area. Note that the point group of the marks 62c (filled circle marks) and the point group of the marks 64c (× marks) indicate the point groups on the outermost edge side of the right area with reference to the rear front of the vehicle 1, as the detection result by the sonars 17b and 17c and the detection result by the sonars 17c and 17d, respectively. The point group of the marks 62d (filled circle marks) and the point group of the marks 64d (× marks) indicate the point groups on the innermost edge side of the right area with reference to the rear front of the vehicle 1, as the detection result by the sonars 17b and 17c and the detection result by the sonars 17a and 17b, respectively.

Next, a scene in which the vehicle 1 travels at a relatively high speed equal to or higher than the second speed in backward travel is considered. As a scene where the vehicle travels at a relatively high speed in backward travel, a case where the distance to the object is relatively long is considered. When the object is separated from the vehicle 1 as described above, the posture of the object may be inclined with respect to the vehicle 1 (host vehicle). In addition, since the vehicle speed is higher than that during the backward low speed travel, the stop distance after the object is detected becomes longer than that during the backward low speed travel. In addition, in a case where the object exists obliquely with respect to the host vehicle, for example, in a case where the object is across the vehicle width line of the vehicle 1 in an oblique posture, there is a case where a part exists inside the vehicle width line, that is, at a position where it is highly likely to come into contact with the vehicle 1, and a part exists outside the vehicle width line, that is, at a position where it is less likely to come into contact with the vehicle 1. In such a case, it may be difficult to appropriately execute the automated braking.

FIG. 7 is an exemplary explanatory diagram schematically illustrating a detection error width and an automated braking execution area used during the backward high speed travel of the vehicle 1 (the second speed or more, for example, several km/h or more) in the automated braking control device (automated braking control unit 30). FIG. 7 illustrates, as one example, a case where another vehicle M exists in a 45° oblique posture across the left vehicle width line 68a with respect to the vehicle 1.

By the way, in a case where an ultrasonic wave is transmitted as in the sonar 17, a transmission wave that is reflected by an object and returned (reception wave) is received, and the position of the object (distance to the object) is detected, the position (distance) of the object is detected on the basis of the reception wave returned from the position closest to the sonar 17. In the case of FIG. 7, a corner of the other vehicle M is detected as the position of the other vehicle M but is included in an outer area R1 of the left vehicle width line 68*a* in the backward direction, and thus automated braking is not executed basically. Then, until the other vehicle M and the vehicle 1 approach each other, the corner of the other vehicle M deviates from the detection range of the sonars 17, and further an outer edge of the detection range of the sonar 17 overlaps the intersection of the left vehicle width line 68*a* and the other vehicle M, the contact position between the vehicle 1 and the other vehicle M cannot be detected.

Also in the case of FIG. 7, the distance calculation (distance measurement) is executed in the left area with the rear front of the vehicle 1 (the vehicle width direction distance of "0") as a boundary by executing triangulation with the sonars 17*b* and 17*c* and the sonars 17*c* and 17*d* provided on the rear bumper of the vehicle 1.

As described above, automated braking processing is executed when the speed is equal to or lower than the first speed (for example, several tens of km/h or less), but the visibility of the driver with respect to the surroundings may be reduced during the backward travel as compared with that during the forward travel. In addition, when the posture of the other vehicle M exists to be inclined 45° obliquely across the left vehicle width line 68*a*, a part closer to the vehicle 1 (such as the corner of the other vehicle M) is more easily detected, as illustrated in FIG. 7. FIG. 7 illustrates the position where the other vehicle M intersects with the left vehicle width line 68*a* (a position equivalent to the position where the dummy object exists on the left vehicle width line 68*a*) by marks 70*a* and 70*b* and marks 72*a* and 72*b* as the detection error range by the sonars 17. The position where the other vehicle M and the left vehicle width line 68*a* intersect is a stop distance when braking with a predetermined braking power is performed for each vehicle speed at the start of braking of the vehicle 1. The stop distance is a known value determined by the vehicle speed and the performance (braking capability) of the braking device. That is, an area indicated by the point groups of the marks 70*a* and 70*b* and the marks 72*a* and 72*b* is an area where the other vehicle M existing at a position where it can be considered that the vehicle 1 can be stopped while the vehicle 1 does not come into contact with the other vehicle M at any vehicle speed can be detected. Therefore, the detection error width acquisition unit 44 acquires an area surrounded by the point groups of the marks 70*a* and 70*b* and the marks 72*a* and 72*b* as the detection error width of the object during the backward high speed travel in the left area. Note that the point group of the marks 70*a* (outlined triangle marks) and the point group of the marks 72*a* (filled triangle marks) indicate the point groups on the outermost edge side of the left area with reference to the rear front of the vehicle 1, as the detection result by the sonars 17*b* and 17*c* and the detection result by the sonars 17*c* and 17*d*, respectively. The point group of the marks 70*b* (outlined triangle marks) and the point group of the marks 72*b* (filled triangle marks) indicate the point groups on the innermost edge side of the left area with reference to the rear front of the vehicle 1, as the detection result by the sonars 17*b* and 17*c* and the detection result by the sonars 17*c* and 17*d*, respectively.

Similarly, distance calculation (distance measurement) is executed in the right area with the rear front of the vehicle 1 (vehicle width direction distance of "0") as a boundary by executing triangulation with the sonars 17*b* and 17*c* and the sonars 17*a* and 17*b*. An area indicated by the point groups of marks 70*c* and 70*d* and marks 72*c* and 72*d* is an area where the other vehicle M existing at a position where it can be considered that the vehicle 1 can be stopped while the vehicle 1 does not come into contact with the other vehicle M at any vehicle speed can be detected. Therefore, the detection error width acquisition unit 44 acquires an area surrounded by the point groups of the marks 70*c* and 70*d* and the marks 72*c* and 72*d* as the detection error width of the object during the backward high speed travel in the right area. Note that the point group of the marks 70*c* (outlined triangle marks) and the point group of the marks 70*c* (filled triangle marks) indicate the point groups on the outermost edge side of the right area with reference to the rear front of the vehicle 1, as the detection result by the sonars 17*b* and 17*c* and the detection result by the sonars 17*c* and 17*d*, respectively. The point group of the marks 70*d* (outlined triangle marks) and the point group of the marks 64*d* (filled triangle marks) indicate the point groups on the Innermost edge side of the right area with reference to the rear front of the vehicle 1, as the detection result by the sonars 17*b* and 17*c* and the detection result by the sonars 17*a* and 17*b*, respectively.

Referring back to FIG. 4, the steering angle acquisition unit 46 acquires the steering angle of the vehicle 1 on the basis of the detection result of the steering angle sensor 19. That is, the turning direction of the vehicle 1 is acquired. In accordance with the turning direction of the vehicle 1, the extending directions of the left vehicle width lines 52*a*, 60*a*, and 68*a* and right vehicle width lines 52*b*, 60*b*, and 68*b* are changed, and the existence area of the detection error width of the sonar 17 acquired by the detection error width acquisition unit 44 is changed. That is, in accordance with the turning direction of the vehicle 1, the detection error width is acquired, and the automated braking execution area, which will be described later, is set.

On the basis of the traveling direction information and the speed information (the vehicle speed information acquired by the vehicle speed acquisition unit 36 or the relative speed information acquired by the relative speed acquisition unit 40) acquired by the traveling direction information acquisition unit 42, the area determination unit 48 determines automated braking execution areas E1, E2, and E3 set in at least one of the inner area R2 and the outer area R1 with respect to the left vehicle width lines 52*a*, 60*a*, and 68*a* and the right vehicle width lines 52*b*, 60*b*, and 68*b*, each extending in the traveling direction in accordance with the vehicle width of the vehicle 1.

For example, at the time of forward travel illustrated in FIG. 5, as described above, it is relatively easy for the driver to confirm an object and determine the likeliness of contact. Therefore, braking of the vehicle 1 prioritizes the operation of the driver so as not to execute excessive automated braking. Thus, when the traveling direction of the vehicle 1 is a forward direction and the vehicle speed or the relative speed is the first speed or less, the area determination unit 48 selects (determines) the automated braking execution area E1 that is defined by automated braking execution boundary lines 58*a* and 58*b* on the innermost edge side of the detection error width acquired by the detection error width acquisition unit 44. That is, the area range of the automated braking execution area E1 is set on the basis of variation in the detection position by the sonar 17.

In addition, during the backward low speed travel illustrated in FIG. 6, as described above, visual confirmation of an object, determination of the likeliness of contact, etc. by the driver are more degraded than those during the forward travel, but the vehicle speed (relative speed) is low. Therefore, the braking of the vehicle 1 is executed easily and quickly, and the vehicle 1 can be stopped. An operation of the driver is also prioritized during the backward low speed travel such that excessive automated braking is not executed. Therefore, when the traveling direction of the vehicle 1 is a backward direction and the vehicle speed or the relative speed is less than the second speed, the area determination unit 48 selects (determines) the automated braking execution area E2 defined by automated braking execution boundary lines 66*a* and 66*b* on the innermost edge side of the detection error width acquired by the detection error width acquisition unit 44. That is, the area range of the automated braking execution area E2 is set on the basis of the variation in the detection position by the sonar 17.

Meanwhile, during the backward high speed travel illustrated in FIG. 7, as described above, visual confirmation of an object, determination of the likeliness of contact, and so forth by the driver are more degraded than those during the forward travel, and further, the vehicle speed (relative speed) is higher than that in the case of FIG. 6, so the stop distance is longer. It is necessary to execute the braking of the vehicle 1 earlier and stop the vehicle 1 with time to spare. Therefore, during the backward high speed travel, the automated braking is prioritized such that automated braking is easily executed. Thus, when the traveling direction of the vehicle 1 is a backward direction and the vehicle speed or the relative speed is the second speed or higher, the area determination unit 48 selects (determines) the automated braking execution area E3 defined by automated braking execution boundary lines 74*a* and 74*b* on the outermost edge side of the detection error width acquired by the detection error width acquisition unit 44. That is, the area range of the automated braking execution area E3 is set on the basis of the variation in the detection position by the sonar 17.

When an object or the other vehicle M is detected, the automated braking processing unit 50 determines whether to execute automated braking on the basis of the position information of the object or the other vehicle M with respect to the automated braking execution areas E1, E2, and E3. That is, control of the brake system 18 is executed via the braking control unit 32 to execute automated braking of the vehicle 1.

An example of a flow of automated braking control processing by the automated braking control device (automated braking control unit 30) configured in this manner will be described with reference to a flowchart of FIG. 8.

The automated braking control unit 30 is activated in a state where an ignition switch or the like of the vehicle 1 is turned on, and the vehicle 1 can travel. When the vehicle 1 is in a travelable state, it is assumed that each sonar 17 transmits and receives ultrasonic waves and constantly performs detection processing of an object around the vehicle 1 (for example, forward and backward). Then, the automated braking control unit 30 determines whether the speed of the vehicle 1 (vehicle speed or relative speed) is the operation speed of the automated braking system (for example, several tens of km/h or less) (S100). When the speed of the vehicle is not the operation speed of the automated braking system (No in S100), for example, when the speed of the vehicle 1 exceeds several tens of km/h or when the vehicle 1 is stopped, this flow is temporarily ended, and monitoring whether the automated braking system reaches the operation speed is continued.

In the automated braking control unit 30, when the speed of the vehicle is the operation speed of the automated braking system (Yes in S100), for example, when the speed of the vehicle 1 becomes several tens km/h or less, the vehicle shape acquisition unit 34 acquires vehicle shape information (vehicle width information) of the vehicle 1 (S102), and subsequently the vehicle speed acquisition unit 36 acquires vehicle speed information (speed information) of the vehicle 1 (S104).

The braking control unit 32 determines whether the braking is currently being performed, and when the braking is not being performed (No in S106), the traveling direction information acquisition unit 42 acquires shift information via the shift sensor 21 (S108). When the current state of the vehicle 1 is a backward travelable state (Yes in S110), and when the current speed is the switching speed or higher in the automated braking execution area, that is, equal to or higher than the second speed (for example, several km/h or more) (Yes in S112), the detection error width acquisition unit 44 acquires the detection error width at the backward high speed threshold (S114). That is, the detection error width acquisition unit 44 acquires the detection error width illustrated in FIG. 7. Meanwhile, when the current speed is less than the switching speed in the automated braking execution area, that is, less than the second speed (for example, less than several km/h) (No in S112), the detection error width acquisition unit 44 acquires the detection error width at the backward low speed threshold (S116). That is, the detection error width acquisition unit 44 acquires the detection error width illustrated in FIG. 6. In processing of S110, when the current state of the vehicle 1 is a forward travelable state (No in S110), the detection error width during the forward travel is acquired (S118). That is, the detection error width acquisition unit 44 acquires the detection error width illustrated in FIG. 5.

The area determination unit 48 then determines one of the automated braking execution area E1, the automated braking execution area E2, or automated braking execution area E3, on the basis of the vehicle width line based on the vehicle shape of the vehicle 1 and the detection error width acquired in S114, S116, or S118 (S120).

When the position information (detection point of the object) acquired by the position information acquisition unit 38 based on the detection result of the sonar 17 is within an area of the determined automated braking execution area, the automated braking processing unit 50 executes automated braking execution processing (S124). That is, the automated braking processing unit 50 executes the automated braking by operating the brake system 18 via the braking control unit 32 to stop or decelerate the vehicle 1. When the acquired position information (detection point of the object) is outside the area of the determined automated braking execution area, the automated braking processing unit 50 executes automated braking unnecessary processing (S126). That is, the automated braking processing unit 50 does not execute the automated braking even when an object is detected around the vehicle 1.

When the vehicle 1 stops (Yes in S128), the automated braking control unit 30 temporarily ends this flow. Meanwhile, when the vehicle 1 is not stopped (No in S128), the processing returns to S100, the determination as to whether the vehicle 1 is at the operation speed of the automated braking system is continued, and the processing after S100 are continued.

In S106, when the automated braking system is operating and braking is being performed (Yes in S106), the automated braking execution area at the time of starting the automated braking operation is maintained (S130), the processing proceeds to S122, and the processing of S122 and subsequent processing are continued. With this processing, for example, even when the vehicle speed fluctuates due to automated braking during the automated braking processing, the automated braking execution area is prevented from being changed. For example, when the automated braking execution area E3 during the backward high speed travel is selected, the vehicle speed may decreases to switch the area to the automated braking execution area E2, and the automated braking may be stopped in the middle. However, since the automated braking execution area E3 is maintained by the processing of S130, the automated braking is continued regardless of the vehicle speed, and the vehicle 1 can be reliably decelerated or stopped.

As described above, with the automated braking control device (automated braking control unit 30) of the present embodiment, more appropriate automated braking control can be executed in accordance with the traveling state of the vehicle, the state of the object, etc.

In the embodiment described above, an example that the automated braking execution area is not switched by the speed in the case of the forward travel unlike in the backward travel is described. In another embodiment, even in the case of forward travel, the automated braking execution area may be switched by the speed as in the case of backward travel. In this case, the automated braking control can be performed in more detail.

Moreover, in the embodiment described above, the example that the position information of the object is performed only by the sonar 17 is described. In another embodiment, in a case where the image capturing unit 15 and the radar 16 are used in combination, and the visibility of the object can be improved, the range of the automated braking execution area may be narrowed to further suppress excessive execution of the automated braking.

Note that, when the automated braking of the present embodiment is executed, the driver or the like may be notified that the automated braking is being executed. In this case, notification can be made via the display device 8 or the voice output device 9, and it is possible to suppress uncomfortable feeling of the driver caused by automated braking that can be suddenly executed. In addition, the automated braking control device of the present embodiment may be combined with other systems such as automated braking at the time of sudden start due to erroneous depression of the acceleration operation unit 5 (accelerator pedal), parking assistance, and travel assistance, and may reduce the burden on the driver, improve safety, etc.

Note that the automated braking processing program executed by the CPU 14a described above may be provided by being recorded in a computer-readable recording medium such as a CD-ROM, a flexible disk (FD), a CD-R, or a digital versatile disk (DVD) as a file in an installable format or an executable format.

Moreover, the automated braking processing program may be stored on a computer connected to a network such as the Internet and provided by being downloaded via the network. The automated braking processing program executed by the CPU 14a may be provided or distributed via a network such as the Internet.

Although embodiments and modifications are described, these embodiments and modifications are presented as examples, and are not intended to limit the scope of the claims. These novel embodiments can be implemented in various other forms, and various omissions, substitutions, and changes can be made without departing from the gist of the disclosure. These embodiments and modifications thereof are included in the scope and gist of the disclosure, and are encompassed in the claims and the equivalent scope thereof.

EXPLANATIONS OF LETTERS OR NUMERALS

1 . . . vehicle
14a . . . CPU
17, 17a, 17b, 17c, 17d, 17e, 17f, 17g, 17h . . . sonar
18 . . . brake system
21 . . . shift sensor
22 . . . wheel speed sensor
30 . . . automated braking control unit
32 . . . braking control unit
34 . . . vehicle shape acquisition unit
36 . . . vehicle speed acquisition unit
38 . . . position information acquisition unit
40 . . . relative speed acquisition unit
42 . . . traveling direction information acquisition unit
44 . . . detection error width acquisition unit
46 . . . steering angle acquisition unit
48 . . . area determination unit
50 . . . automated braking processing unit
E1, E2, E3 . . . automated braking execution area

The invention claimed is:

1. An automated braking control device comprising:
an acquisition unit configured to acquire traveling direction information representing a traveling direction of a vehicle, speed information related to the vehicle, and position information of an object based on a detection wave transmitted and received for detecting the object in the traveling direction;
an area determination unit configured to determine an automated braking execution area on the basis of the traveling direction information and the speed information, the automated braking execution area being set in at least one of an inner area and an outer area with respect to a vehicle width line, the vehicle width line extending in the traveling direction in accordance with a vehicle width of the vehicle; and
an automated braking processing unit configured to, when the object is detected, determine whether to execute automated braking on the basis of the position information with respect to the automated braking execution area,
wherein the area determination unit is configured to
determine the automated braking execution area to be at a front side of the vehicle in response to determining that the traveling direction information represents forward travel of the vehicle,
determine the automated braking execution area to be at a rear side of the vehicle in response to determining that the traveling direction information represents backward travel of the vehicle,
set, in an inner area inside the vehicle width line, an automated braking execution area boundary line being a boundary of the automated braking execution area in response to determining that the traveling direction information represents forward travel of the vehicle and the speed information represents a first speed or lower,
set the automated braking execution area boundary line to include at least an outer area outside the vehicle width line in response to determining that the traveling direction information represents backward travel of the vehicle and the speed information represents lower than a second speed, and
set the automated braking execution area boundary line in the outer area outside the vehicle width line in response to determining that the traveling direction information represents backward travel of the vehicle and the speed information represents the second speed or higher.

2. The automated braking control device according to claim 1, wherein the automated braking execution area has an area range being set on the basis of variation in detection positions obtained when triangulation using two of sensors is performed, the sensors being provided at each of a front end and a rear end of the vehicle to transmit and receive the detection wave.

3. The automated braking control device according to claim 2, wherein the area determination unit is configured to
   determine the automated braking execution area by the speed information obtained when the object is detected, and
   maintain the determined automated braking execution area until the vehicle stops.

4. The automated braking control device according to claim 2, wherein the automated braking execution area is set such that an outer area of the vehicle width line in a case where the vehicle travels backward is wider than in a case where the vehicle travels forward.

5. The automated braking control device according to claim 3, wherein the automated braking execution area is set such that an outer area of the vehicle width line in a case where the vehicle travels backward is wider than in a case where the vehicle travels forward.

6. An automated braking processing non-transitory computer-readable medium causing a computer to execute:
   an acquisition step of acquiring traveling direction information representing a traveling direction of a vehicle, speed information related to the vehicle, and position information of an object based on a detection wave transmitted and received for detecting the object in the traveling direction;
   an area determination step of determining an automated braking execution area on the basis of the traveling direction information and the speed information, the automated braking execution area being set in at least one of an inner area and an outer area with respect to a vehicle width line, the vehicle width line extending in the traveling direction in accordance with a vehicle width of the vehicle; and
   an automated braking processing unit step of, when the object is detected, determining whether to execute automated braking on the basis of the position information with respect to the automated braking execution area,
   wherein, in the area determination step
   the automated braking execution area is determined to be at a front side of the vehicle in response to determining that the traveling direction information represents forward travel of the vehicle,
   the automated braking execution area is determined to be at a rear side of the vehicle in response to determining that the traveling direction information represents backward travel of the vehicle,
   an automated braking execution area boundary line being a boundary of the automated braking execution area is set in an inner area inside the vehicle width line in response to determining that the traveling direction information represents forward travel of the vehicle and the speed information represents a first speed or lower,
   the automated braking execution area boundary line is set to include at least an outer area outside the vehicle width line in response to determining that the traveling direction information represents backward travel of the vehicle and the speed information represents lower than a second speed, and
   the automated braking execution area boundary line is set in the outer area outside the vehicle width line in response to determining that the traveling direction information represents backward travel of the vehicle and the speed information represents the second speed or higher.

7. The automated braking control device according to claim 1, wherein the area determination unit is configured to
   determine the automated braking execution area by the speed information obtained when the object is detected, and
   maintain the determined automated braking execution area until the vehicle stops.

8. The automated braking control device according to claim 7, wherein the automated braking execution area is set such that an outer area of the vehicle width line in a case where the vehicle travels backward is wider than in a case where the vehicle travels forward.

9. The automated braking control device according to claim 1, wherein the automated braking execution area is set such that an outer area of the vehicle width line in a case where the vehicle travels backward is wider than in a case where the vehicle travels forward.

10. The automated braking control device according to claim 1, wherein the area determination unit is configured to
    determine the automated braking execution area by the speed information obtained when the object is detected, and
    maintain the determined automated braking execution area until the vehicle stops.

11. The automated braking control device according to claim 10, wherein the automated braking execution area is set such that an outer area of the vehicle width line in a case where the vehicle travels backward is wider than in a case where the vehicle travels forward.

12. The automated braking control device according to claim 1, wherein the automated braking execution area is set such that an outer area of the vehicle width line in a case where the vehicle travels backward is wider than in a case where the vehicle travels forward.

* * * * *